United States Patent
Yoshimura et al.

(10) Patent No.: US 9,964,211 B2
(45) Date of Patent: May 8, 2018

(54) PISTON OF AXIAL PISTON PUMP MOTOR, CYLINDER BLOCK OF AXIAL PISTON PUMP MOTOR, AND AXIAL PISTON PUMP MOTOR

(71) Applicant: KAWASAKI JUKOGYO KABUSHIKI KAISHA, Kobe-shi, Hyogo (JP)

(72) Inventors: Isamu Yoshimura, Kobe (JP); Ryo Nomura, Kobe (JP); Hisao Wada, Kobe (JP); Ryuji Sakai, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 562 days.

(21) Appl. No.: 14/420,560

(22) PCT Filed: Feb. 20, 2014

(86) PCT No.: PCT/JP2014/054003
§ 371 (c)(1),
(2) Date: Feb. 9, 2015

(87) PCT Pub. No.: WO2014/171178
PCT Pub. Date: Oct. 23, 2014

(65) Prior Publication Data
US 2015/0219215 A1    Aug. 6, 2015

(30) Foreign Application Priority Data
Apr. 16, 2013 (JP) ................................. 2013-085826

(51) Int. Cl.
*F16J 1/09* (2006.01)
*F04B 27/08* (2006.01)
(Continued)

(52) U.S. Cl.
CPC ............... *F16J 1/09* (2013.01); *F03C 1/0605* (2013.01); *F04B 1/124* (2013.01); *F04B 1/22* (2013.01);
(Continued)

(58) Field of Classification Search
CPC .. F04B 1/124; F04B 1/12; F04B 27/08; F04B 27/0878; F04B 39/122; F01B 3/00; F04C 2230/10
(Continued)

(56) References Cited

U.S. PATENT DOCUMENTS 5,083,474 A    1/1992  Rouverol
5,970,845 A    10/1999 Beck
(Continued)

FOREIGN PATENT DOCUMENTS

JP    H09-177670 A    7/1997
JP    H10-266970 A    10/1998
(Continued)

OTHER PUBLICATIONS

May 20, 2014 International Search Report issued in International Patent Application No. PCT/JP2014/054003.
(Continued)

*Primary Examiner* — Michael Quandt
(74) *Attorney, Agent, or Firm* — Oliff PLC (57) ABSTRACT

An end part of a piston on a front edge side is formed so as to have a crowning of a 1.2-order to 2.5-order curve where a length is 10% or more and 80% or less of a length of a cylindrical part and a height is 10% or more and 160% or less of a clearance. An end part of a cylinder block on a front edge side is formed so as to have a crowning of a 1.2-order to 2.5-order curve where a length is 8% or more and 60% or less of the length of a cylindrical part and a height is 12% or more and 125% or less of the clearance.

5 Claims, 2 Drawing Sheets (51) Int. Cl.
   *F04B 1/12* (2006.01)
   *F04B 1/22* (2006.01)
   *F04B 53/14* (2006.01)
   *F03C 1/28* (2006.01)
   *F04B 39/12* (2006.01)
   *F01B 3/00* (2006.01)

(52) U.S. Cl.
   CPC .............. *F04B 53/14* (2013.01); *F01B 3/007* (2013.01); *F04B 27/0878* (2013.01); *F04B 39/122* (2013.01)

(58) Field of Classification Search
   USPC ...................................................... 92/71, 172
   See application file for complete search history.

(56) References Cited

U.S. PATENT DOCUMENTS

| | | | |
|---|---|---|---|
| 6,016,739 A * | 1/2000 | Baehler | F04B 1/124 92/172 |
| 6,212,995 B1 * | 4/2001 | Hasegawa | F04B 27/1045 92/169.1 |
| 6,378,417 B1 * | 4/2002 | Miyazawa | F04B 27/1045 92/169.1 |
| 6,575,080 B1 * | 6/2003 | Enokijima | F04B 27/0878 92/172 |
| 8,991,300 B2 * | 3/2015 | Moroi | F04B 1/29 417/222.1 |
| 2010/0027932 A1 | 2/2010 | Fujiwara | |

FOREIGN PATENT DOCUMENTS

| | | |
|---|---|---|
| JP | 2000-506585 A | 5/2000 |
| JP | 2001-032767 A | 2/2001 |
| JP | 2004-239077 A | 8/2004 |
| JP | 4828371 B2 | 11/2011 |

OTHER PUBLICATIONS

Nov. 7, 2016 Extended Search Report issued in European Patent Application No. 14785582.9.

* cited by examiner

PISTON OF AXIAL PISTON PUMP MOTOR, CYLINDER BLOCK OF AXIAL PISTON PUMP MOTOR, AND AXIAL PISTON PUMP MOTOR

TECHNICAL FIELD

The present invention relates to a piston and a cylinder block of an axial piston pump motor which can be suitably used for construction machinery or general industrial machinery. Further, the present invention relates to an axial piston pump motor which can be suitably used for the construction machinery or the general industrial machinery.

BACKGROUND ART

In a swash plate type piston pump motor, when a piston reciprocates within a cylinder bore by rotation of the cylinder block, a very high contact pressure is generated at a contact surface between the piston and the cylinder bore. Then, in a case where the swash plate type piston pump motor is used for construction machinery or the like under high pressure or in a case where working fluid is fire resistant fluid, fire resistant refrigerant, or the like and has low lubricity, seizure may be generated at the piston or the cylinder bore.

In such a background, the swash plate type piston pump motor described in Japanese Patent No. 4828371 (Patent Document 1) has been proposed as the swash plate type piston pump motor capable of suppressing the seizure. This swash plate type piston pump motor includes a cylinder block and a piston which is slide-fitted (inserted) into a piston chamber of the cylinder block so as to be capable of advancing and retreating. A taper part whose diameter is reduced from a piston inserting side to another side is formed on an inner circumferential wall of the piston chamber. Further, a tilt angle of the taper part is set to from 1° to 10°. Patent Document 1 describes that since the tilt angle of the taper part is set to from 1° to 10°, a contact stress between the piston and the cylinder can be reduced.

PRIOR ART DOCUMENT

Patent Document

Patent Document 1: Japanese Patent No. 4828371

SUMMARY OF THE INVENTION

Problems to be Solved by the Invention

However, in the conventional piston, the taper angle on the inner circumferential wall of the piston chamber is set large in a range of 1° to 10°. Accordingly, in a case where the piston is located around a bottom dead center where the piston is pulled out the most from the piston chamber, a partial contact between the piston and the cylinder block is unavoidable, and a tilt of the contact between the cylinder and the piston becomes excessively large. Then, a large edge load is generated on a front edge side and a rear edge side of the piston or a front edge side of the cylinder, and seizure is generated in these areas.

Accordingly, an object of the present invention is to provide a piston of an axial piston pump motor, a cylinder block of the axial piston pump motor, and the axial piston pump motor, in which seizure is hardly generated at the cylinder or the piston.

Solutions to the Problems

To solve the above problems, the present invention provides a piston of an axial piston pump motor including:
a cylindrical part having an outer circumferential surface which is slide-fitted to an inner circumferential surface of a piston chamber of a cylinder block so as to be capable of advancing and retreating with a clearance between the outer circumferential surface and the inner circumferential surface, wherein
at least one of
  crowning processing performed on a protrusion end part situated on a side protruding from the piston chamber in an axial direction of the outer circumferential surface so as to form, in a cross section in the axial direction of the outer circumferential surface, a 1.2-order to 2.5-order curve within a range in which a length is 10% or more and 80% or less of a length of the cylindrical part and a height is 10% or more and 160% or less of the clearance in case of using a front edge of the protrusion end part as a standard, and
  crowning processing performed on an insertion end part situated on a side inserted into the piston chamber in the axial direction of the outer circumferential surface so as to form, in the cross section, a 1.2-order to 2.5-order curve within a range in which a length is 10% or more and 60% or less of the length of the cylindrical part and a height is 10% or more and 160% or less of the clearance in case of using a rear edge of the insertion end part as a standard,
is performed, and
a tilt angle of the end part subjected to the crowning processing is within a range of 0° or more and less than 1°.

The present inventors have found that, when the crowning processing is performed on the end part in the axial direction of the outer circumferential surface of the cylindrical part of the piston so as to form, in the cross section in the axial direction of the outer circumferential surface, the 1.2-order to 2.5-order curve within the range in which the length is 10% or more and 80% or less of the length of the cylindrical part and the height is 10% or more and 160% or less of the clearance, seizure of the end part of the cylindrical part and seizure of the piston chamber can be suppressed. The "1.2-order to 2.5 order curve" may be expressed mathematically as a $x^{1.2}$ to $x^{2.5}$ curve.

Further, in the same manner, the present inventors have found that, when the crowning processing is performed on the opposite-side end part in the axial direction of the outer circumferential surface of the cylindrical part of the piston (the side inserted into the piston chamber) so as to form, in the cross section, the 1.2-order to 2.5-order curve within the range in which the length is 10% or more and 60% or less of the length of the cylindrical part and the height is 10% or more and 160% or less of the clearance, seizure of the opposite-side end part of the cylindrical part (the side inserted into the piston chamber) and seizure of the piston chamber can be suppressed.

The present inventors assume that this is because the tilt angle of the portion subjected to the crowning processing is less than 1°, the order of the curve of the crowning processed surface in the cross section in the axial direction is from 1.2-order to 2.5-order, and compared with a case of the order of about first order which has been conventionally employed, the crowning processed surface becomes a considerably smooth curved surface, and accordingly, even when a partial contact between the piston and the cylinder block occurs, an excessively large edge load is not generated.

According to the present invention, since the above-described crowning processing is performed, even when the partial contact between the piston and the cylinder block occurs, the excessively large edge load is not generated, and the seizure of the piston and the cylinder block can be suppressed.

Moreover, the present invention provides a cylinder block of an axial piston pump motor including:

a plurality of piston chambers disposed at intervals from one another in a circumferential direction of an output shaft, each of the piston chambers having an inner circumferential surface, into which a cylindrical part of a piston is inserted with a clearance so as to be capable of advancing and retreating, wherein crowning processing is performed on an end part situated on an insertion side of the piston in the inner circumferential surface of each of the piston chambers so as to form, in a cross section in an axial direction of the inner circumferential surface, a 1.2-order to 2.5-order curve in a range in which a length is 8% or more and 60% or less of a length of the cylindrical part and a height is 12% or more and 125% or less of the clearance in case of using a front edge on the side, into which the piston is inserted, as a standard, and a tilt angle of the end part subjected to the crowning processing is within a range of 0° or more and less than 1°.

Since the piston of the present invention has a seizure suppressing effect, it can be easily understood and is also true that when the tilt angle is less than 1° and small, and the smooth crowning processing is performed on the piston chamber of the cylinder block, to which the piston is slide-fitted so as to be capable of advancing and retreating, seizure can be suppressed.

According to the present invention, the crowning processing is performed on the end part of the inner circumferential surface of each of the piston chambers so as to form, in the cross section in the axial direction of the inner circumferential surface, the 1.2-order to 2.5-order curve within the range in which the length is 8% or more and 60% or less of the length of the cylindrical part and the height is 12% or more and 125% or less of the clearance. Accordingly, the seizure of the piston and the cylinder block can be suppressed.

Moreover, an axial piston pump motor of the present invention includes:

a housing;

a cylinder block which is accommodated in the housing and connected to an output shaft, the cylinder block having a plurality of piston chambers; and the piston of the axial piston pump motor according to claim 1, wherein crowning processing is performed on a protrusion end part situated on a side protruding from the piston chamber in an axial direction of the outer circumferential surface of the piston so as to form, in a cross section in the axial direction of the outer circumferential surface, a 1.2-order to 2.5-order curve within a range in which a length is 10% or more and 80% or less of a length of the cylindrical part and a height is 10% or more and 160% or less of the clearance in case of using a front edge of the protrusion end part as a standard, a tilt angle of the end part subjected to the crowning processing is within a range of 0° or more and less than 1°, and a length subjected to the crowning processing is a length equal to or longer than a length of the outer circumferential surface of the piston protruding from the piston chamber at a bottom dead center.

According to the present invention, the length of the crowning processed part located at the end part is the length equal to or longer than the length of the outer circumferential surface of the piston protruding from the piston chamber at the bottom dead center. Consequently, the end in the axial direction of the inner circumferential surface of the piston chamber always makes contact with the crowning processed part of the outer circumferential surface of the piston. Therefore, a surface pressure of the end in the axial direction of the inner circumferential surface of the piston chamber and a surface pressure of the outer circumferential surface of the piston in contact with this end does not become excessively large, and the seizure of the cylinder block and the piston can be further suppressed.

Moreover, an axial piston pump motor of the present invention includes:

a housing;

a cylinder block which is accommodated in the housing and connected to an output shaft, the cylinder block having a plurality of piston chambers; and the piston of the axial piston pump motor according to claim 1, wherein crowning processing is performed on an insertion end part situated on a side inserted into the piston chamber in an axial direction of the outer circumferential surface of the piston so as to form, in the cross section, a 1.2-order to 2.5-order curve within a range in which a length is 10% or more and 60% or less of the length of the cylindrical part and a height is 10% or more and 160% or less of the clearance in case of using a rear edge of the insertion end part as a standard, a tilt angle of the end part subjected to the crowning processing is within a range of 0° or more and less than 1°, and a length subjected to the crowning processing is a length which is 0.1 times or more and 0.5 times or less as long as a length of the outer circumferential surface of the piston protruding from the piston chamber at a bottom dead center.

The present inventors have confirmed that, when the length of the crowning processed part located at the end part on the side inserted into the piston chamber is the length which is from 0.1 times to 0.5 times as long as the length of the outer circumferential surface of the piston protruding from the piston chamber at the bottom dead center, the seizure of the end part on the side inserted into the piston chamber can be efficiently suppressed.

The present inventors assume that this is because a degree, to which the piston partially contacts, is small on the back side of the piston chamber, and when the length of the crowning processed part is increased, it is hard for the piston to advance and retreat smoothly.

According to the present invention, the seizure of the end part on the side inserted into the piston chamber can be efficiently suppressed, and the smooth advancing and retreating of the piston are not prevented.

Effects of the Invention

The present invention can realize the piston of the axial piston pump motor, the cylinder block of the axial piston pump motor, and the axial piston pump motor, in which the seizure is hardly generated at the cylinder or the piston.

EMBODIMENT OF THE INVENTION

Hereinafter, the present invention will be described in detail with reference to an embodiment illustrated in the drawings.

Figure 1:
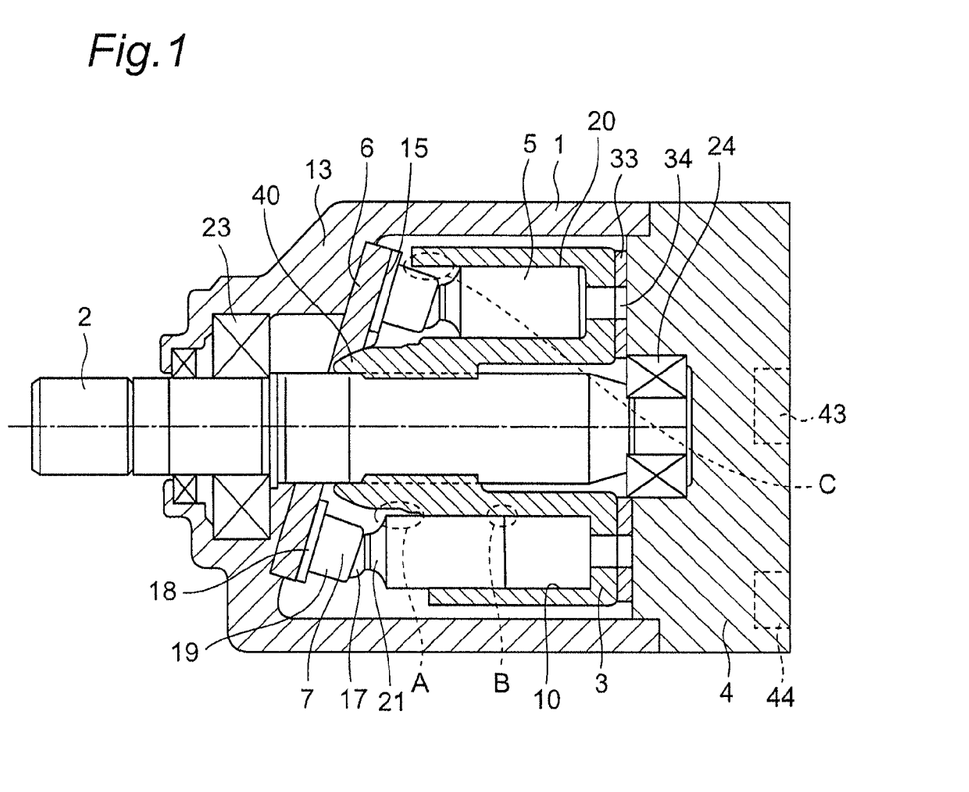
FIG. 1 is a schematic sectional view illustrating a swash plate type piston pump motor of one embodiment of the present invention.

FIG. 1 is a schematic sectional view illustrating a swash plate type piston pump motor of one embodiment of the present invention.

As illustrated in FIG. 1, this swash plate type piston pump motor includes a housing 1, an output shaft 2, a cylinder block 3, a cover 4, a plurality of pistons 5, an annular swash plate 6, and a shoe 7. The cylinder block 3 is accommodated in the housing 1, and the cover 4 closes an opening of the housing 1.

The cylinder block 3 is coaxially coupled to the output shaft 2. The output shaft 2 is supported by bearings 23, 24 so as to be freely rotatable relative to the housing 1. The cylinder block 3 is spline-connected to the output shaft 2 and is connected to the output shaft 2 in a state where relative displacement relative to the output shaft 2 in a circumferential direction thereof is prevented. The cylinder block 3 has a plurality of piston chambers 10, and each piston chamber 10 extends in an axial direction of the output shaft 2. The plurality of piston chambers 10 are disposed at intervals from one another in the circumferential direction of the output shaft 2.

The swash plate 6 is fixed to a front wall 13 of the housing 1. The swash plate 6 is tilted relative to a plane vertical to a center axis of the output shaft 2. The swash plate 6 is disposed so as to be tilted rightward as it goes upward in FIG. 1. A surface of the swash plate 6 facing the cylinder block 3 becomes a sliding surface 15. It should be noted that, the swash plate type piston pump motor of a swash plate fixed type is described in the present embodiment. However, the present invention can be also applied to a swash plate type piston pump motor of a swash plate tilting type or a bent shaft type piston pump motor. Further, the swash plate type piston pump motor of the swash plate fixed type having the shoe is described in the preset embodiment. However, the present invention can be also applied to an axial piston pump motor having no shoe.

The shoe 7 is provided in such a manner that a disk-shaped sliding part 18 and a columnar piston mounting part 19 are integrally formed. The sliding part 18 abuts the sliding surface 15 of the swash plate 6 so as to be freely slidable. Further, the piston mounting part 19 has a spherical mounting recess.

A tip part 17 of the piston 5 on the swash plate 6 side is spherically formed, and this spherical tip part 17 is mounted to the spherical mounting recess of the piston mounting part 19 so as to be freely rotatable. This tip part 17 forms a shoe mounting part. Further, the piston 5 has a substantially columnar cylindrical part 20 and a coupling part 21, and the cylindrical part 20 is connected to the tip part 17 via the coupling part 21. An outer circumferential surface of the cylindrical part 20 is slide-fitted to an inner circumferential surface of the piston chamber 10 so as to be capable of advancing and retreating in the axial direction.

Further, in this embodiment, a clearance between the piston 5 and the piston chamber 10 of the cylinder block 3 is appropriately set. In this way, a tilt of the piston 5 relative to the piston chamber 10 is suppressed, and at the same time, working fluid can flow between the piston chamber 10 and the piston 5. Accordingly, lubricity of a sliding surface between the piston 5 and the piston chamber 10 becomes high.

Each shoe 7 is mounted to a setplate (not illustrated). Further, a retainer 40 is formed at an inner circumferential part of the cylinder block 3. The retainer 40 protrudes to the front wall 13 side of the housing 1 and serves as a plate spring holding part. An annular plate spring (not illustrated) is interposed between this retainer 40 and the setplate.

Figure 2:
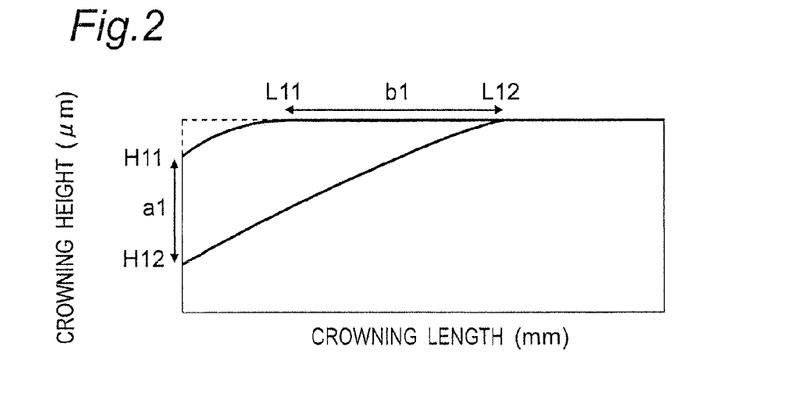
FIG. 2 is a schematic diagram illustrating a shape of an end part situated on a front edge side (side protruding from a piston chamber) illustrated in a region A in FIG. 1 in an outer circumferential surface of a cylindrical part of a piston.

FIG. 2 is a diagram illustrating a shape of an end part situated on a front edge side (the shoe 7 side) illustrated in a region A in FIG. 1 in the outer circumferential surface of the cylindrical part 20 of the piston 5, and a partially enlarged schematic sectional view in the axial direction of the cylindrical part 20.

It should be noted that in FIG. 2, for ease of understanding, the shape of the end part situated on the front edge side in the outer circumferential surface of the cylindrical part 20 is drawn with exaggeration. Further, in FIG. 2, a dotted line indicates a cylindrical outer circumferential surface of the cylindrical part 20 before being subjected to crowning processing, and a thick line indicates a range of the cylindrical outer circumferential surface subjected to the crowning processing.

As illustrated in FIG. 2, the crowning processing is performed on the end part situated on the front edge side (side protruding from the piston chamber 10) in the outer circumferential surface of the cylindrical part 20 of the piston 5 so as to form, in a cross section in the axial direction of the outer circumferential surface, a 1.2-order to 2.5-order curve having a length of b1 [mm] and a height of a1 [μm] in case of using the front edge as a standard. As illustrated in FIG. 2, this crowning processed part is bent so as to approach a center axis of the piston 5 as it goes toward the shoe 7 side in the axial direction. In this case, b1 is a length within a range of L11 [mm]≤b1≤L12 [mm], and a1 is a height within a range of H11 [μm]≤a1≤H12 [μm]. Here, L11 is 10% of a length of the cylindrical part 20 of the piston 5, and L12 is 80% of the length of the cylindrical part 20 of the piston 5. Further, in case of using a clearance between the outer circumferential surface of the cylindrical part 20 of the piston 5 and the inner circumferential surface of the piston chamber 10 of the cylinder block 3 as a standard, H11 is 10% of the clearance, and H12 is 160% of the clearance. It should be noted that this clearance refers to a diameter clearance. In other words, when a radius clearance is used as a standard, H11 is 20% of the radius clearance, and H12 is 320% of the radius clearance.

The length b1 [mm] of the crowning processed part of the end part situated on the front edge side in the outer circumferential surface of the piston 5 is a length equal to or longer than the length of the outer circumferential surface of the piston 5 protruding from the piston chamber 10 at a bottom dead center (a point where the piston 5 protrudes the most from the piston chamber 10).

Figure 3:
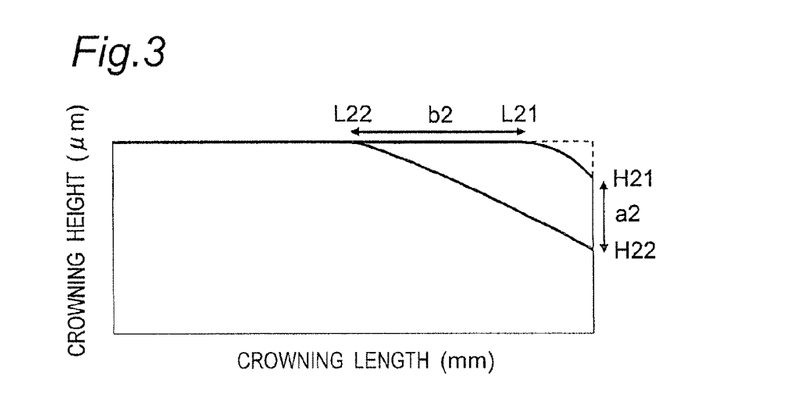
FIG. 3 is a schematic diagram illustrating a shape of an end part situated on a rear edge side (side inserted into the piston chamber) illustrated in a region B in FIG. 1 in the outer circumferential surface of the cylindrical part of the piston.

FIG. 3 is a diagram illustrating a shape of an end part situated on a rear edge side (side opposite to the shoe 7 side) illustrated in a region B in FIG. 1 in the outer circumferential surface of the cylindrical part 20 of the piston 5, and a partially enlarged schematic sectional view in the axial direction of the cylindrical part 20.

In FIG. 3, for ease of understanding, the shape of the end part situated on the rear edge side in the outer circumferential surface of the cylindrical part 20 is drawn with exaggeration. Further, in FIG. 3, a dotted line indicates a cylindrical outer circumferential surface of the cylindrical part 20 before being subjected to crowning processing, and a thick line indicates a range of the cylindrical outer circumferential surface subjected to the crowning processing.

As illustrated in FIG. 3, the crowning processing is performed on the end part situated on the rear edge side (side inserted into the piston chamber 10) in the outer circumferential surface of the cylindrical part 20 of the piston 5 so as to form, in a cross section in the axial direction of the outer circumferential surface, a 1.2-order to 2.5-order curve having a length of b2 [mm] and a height of a2 [μm] in case of using the rear edge as a standard. As illustrated in FIG. 3, the curve of this crowning processed part is bent so as to approach the center axis of the piston 5 as it goes toward the side opposite to the shoe 7 side in the axial direction. In this case, b2 is a length within a range of L21 [mm]≤b2≤L22 [mm], and a2 is a height within a range of H21 [μm]≤a2≤H22 [μm]. Here, L21 is 10% of the length of the cylindrical part 20 of the piston 5, and L22 is 60% of the length of the cylindrical part 20 of the piston 5. Further, in case of using the clearance between the outer circumferential surface of the cylindrical part 20 of the piston 5 and the inner circumferential surface of the piston chamber 10 of the cylinder block 3 as a standard, H21 is 10% of the clearance, and H22 is 160% of the clearance. It should be noted that this clearance refers to a diameter clearance. In other words, when a radius clearance is used as a standard, H21 is 20% of the radius clearance, and H22 is 320% of the radius clearance.

The length b2 [mm] of the crowning of the end part situated on the rear edge side in the outer circumferential surface of the piston 5 is a length which is 0.1 times or more and 0.5 times or less as long as the length of the outer circumferential surface of the piston 5 protruding from the piston chamber 10 at the bottom dead center.

Figure 4:
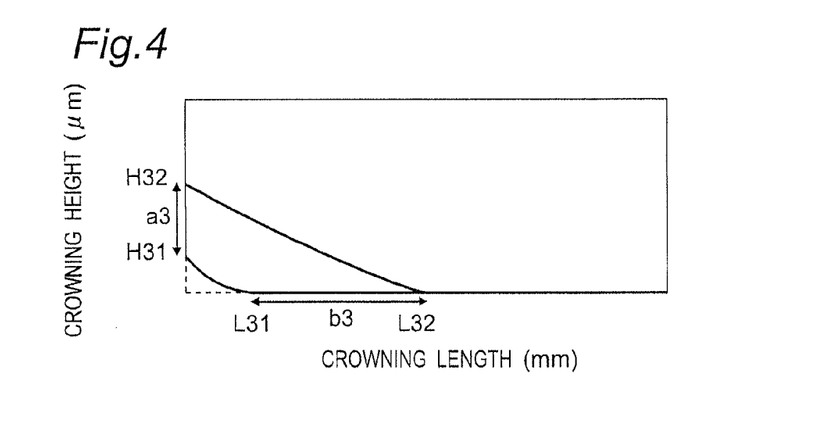
FIG. 4 is a schematic diagram illustrating a shape of an end part situated on a front edge side (insertion side of the piston) illustrated in a region C in FIG. 1 in an inner circumferential surface of the piston chamber of a cylinder block.

FIG. 4 is a diagram illustrating a shape of an end part situated on a front edge side (the shoe 7 side) illustrated in a region C in FIG. 1 in the inner circumferential surface of the piston chamber 10 of the cylinder block 3, and a partially enlarged schematic sectional view in the axial direction of the piston chamber 10.

In FIG. 4, for ease of understanding, the shape of the end part situated on the front edge side in the inner circumferential surface of the piston chamber 10 is drawn with exaggeration. Further, in FIG. 4, a dotted line indicates a cylindrical inner circumferential surface of the piston chamber 10 before being subjected to crowning processing, and a thick line indicates a range of the cylindrical inner circumferential surface subjected to the crowning processing.

As illustrated in FIG. 4, the crowning processing is performed on the end part situated on the front edge side (side into which the piston 5 is inserted) in the inner circumferential surface of the piston chamber 10 of the cylinder block 3 so as to form, in a cross section in the axial direction of the inner circumferential surface, a 1.2-order to 2.5-order curve having a length of b3 [mm] and a height of a3 [μm] in case of using the front edge as a standard. As illustrated in FIG. 4, the curve of this crowning processed part is bent so as to be away from a center axis of the piston chamber 10 as it goes toward the shoe 7 side in the axial direction. In this case, b3 is a length within a range of L31 [mm]≤b3≤L32 [mm], and a3 is a length within a range of H31 [μm]≤a3≤H32 [μm]. Here, L31 is 8% of the length of the cylindrical part 20 of the piston 5, and L32 is 60% of the length of the cylindrical part 20 of the piston 5. Further, in case of using the clearance between the outer circumferential surface of the cylindrical part 20 of the piston 5 and the inner circumferential surface of the piston chamber 10 of the cylinder block 3 as a standard, H31 is 12% of the clearance, and H32 is 125% of the clearance. It should be noted that this clearance refers to a diameter clearance. In other words, when a radius clearance is used as a standard, H31 is 24% of the radius clearance, and H32 is 250% of the radius clearance.

In the above-described configuration, this swash plate type piston pump motor is operated as follows.

When the working fluid is supplied from a working fluid supply port 43 formed at the cover 4, the working fluid is supplied to each piston chamber 10 of the cylinder block 3 disposed on a upper side relative to a paper face of drawing of FIG. 1 via a supply hole 34 of a valve plate 33. Then, the piston 5 is extended to press the shoe 7 toward the swash plate 6 side. As illustrated in FIG. 1, since the swash plate 6 is disposed so as to be tilted leftward as it goes downward, a downward force is given to the shoe 7 which is pressed against the swash plate 6 by the piston 5. Therefore, since the piston 5 disposed on the upper side relative to a paper face of drawing of FIG. 1 is displaced downward while being extended, when viewed from the left side in FIG. 1, the cylinder block 3 and the output shaft 2 coupled to the cylinder block 3 are rotationally driven clockwise. Further, each piston 5 disposed on a lower side relative to the paper face of drawing of FIG. 1 contracts by receiving a force from the swash plate 6 while moving upward together with the cylinder block 3 which rotates. Then, the working fluid within the piston chamber 10 is discharged to the outside via a discharge hole of the valve plate 33 and a working fluid discharge port 44 of the cover 4. In this way, the output shaft 2 is rotationally driven.

Further, this swash plate type piston pump motor can perform an operation opposite to the aforementioned operation by a rotation power of the output shaft, and can change the rotation power of the output shaft into a flow of the working fluid. Therefore, this swash plate type piston pump motor can perform a series of operations in which the working fluid is sucked into the piston chamber 10 and ejected from the piston chamber 10, or the working fluid is supplied into the piston chamber 10 and discharged from the piston chamber 10. This swash plate type piston pump motor can be operated as a pump or a motor.

Further, the working fluid supplied from the supply hole 34 to the piston chamber 10 of the cylinder block 3 is supplied between the shoe 7 and the sliding surface of the swash plate 6 via an oil hole formed the piston 5 and an oil hole formed at the shoe 7, and serves as lubricant. Therefore, the shoe 7 can smoothly slide on the sliding surface 15 of the swash plate 6.

The present inventors have found by experiment that seizure of the protrusion end part of the cylindrical part and seizure of the piston chamber 10 can be suppressed, when the crowning processing is performed on the end part (the protrusion end part on the side protruding from the piston chamber 10) situated on the shoe mounting part side in the axial direction of the outer circumferential surface of the cylindrical part 20 of the piston 5 so as to form, in the cross section in the axial direction of the outer circumferential surface of the cylindrical part 20, the 1.2-order to 2.5-order curve within the range in which the length is 10% or more and 80% or less of the length of the cylindrical part 20 and the height is 10% or more and 160% or less of the clearance in case of using the front edge (the front edge of the protrusion end part) on the shoe mounting part side as a standard. It should be noted that the clearance refers to a diameter clearance, which is a clearance between the outer circumferential surface of the cylindrical part 20 of the piston 5 and the inner circumferential surface of the piston chamber 10 of the cylinder block 3.

Further, in the same manner, the present inventors have found that seizure of the insertion end part of the cylindrical part and the seizure of the piston chamber can be suppressed, when the crowning processing is performed on the end part (the insertion end part on the side inserted into the piston chamber 10) situated on the side opposite to the shoe mounting part side in the axial direction of the outer circumferential surface of the cylindrical part 20 of the piston 5 so as to form, in the cross section in the axial direction of the outer circumferential surface of the cylindrical part 20, the 1.2-order to 2.5-order curve within the range in which the length is 10% or more and 60% or less of the length of the cylindrical part 20 and the height is 10% or more and 160% or less of the clearance in case of using the rear edge (the rear edge of the insertion end part) on the side opposite to the shoe mounting part side as a standard. It should be noted that the clearance refers to a diameter clearance, which is a clearance between the outer circumferential surface of the cylindrical part 20 of the piston 5 and the inner circumferential surface of the piston chamber 10 of the cylinder block 3.

The present inventors assume that this is because the tilt angle of the crowning becomes less than 1° and small, the order of the curve of the crowning processed surface in the cross section in the axial direction is from 1.2-order to 2.5-order, and compared with a case of the order of about first order which has been conventionally employed, the crowning processed surface becomes a smooth curved surface, and accordingly, even when a partial contact between the piston 5 and the cylinder block 3 occurs, an excessively large edge load is not generated. In a case where the tilt angle of the crowning is 0° or more and 0.5° or less, the effect is further remarkable.

Further, since the piston 5 having the crowning has the seizure suppressing effect, it can be easily understood and is also true that the seizure can be suppressed even when the tilt angle of the crowning is less than 1° and the smooth crowning processing is performed on the piston chamber 10 of the cylinder block 3, into which the piston 5 is slide-fitted (inserted) so as to be capable of advancing and retreating. In this case as well, in the case where the tilt angle of the crowning is 0° or more and 0.5° or less, the effect is further remarkable.

Actually, the present inventors have found by experiment that seizure can be suppressed, when the crowning processing is performed on the end part situated on the insertion side of the piston 5 in the inner circumferential surface of each piston chamber 10 so as to form, in the cross section in the axial direction of the inner circumferential surface of the piston chamber 10, the 1.2-order to 2.5-order curve within the range in which the length is 8% or more and 60% or less of the length of the cylindrical part and the height is 12% or more and 125% or less of the clearance in case of using the front edge on the side, into which the piston 5 is inserted, as a standard. It should be noted that the clearance refers to a diameter clearance, which is a clearance between the outer circumferential surface of the cylindrical part 20 of the piston 5 and the inner circumferential surface of the piston chamber 10 of the cylinder block 3.

Further, the present inventors have confirmed that, when the length of the crowning processed part located at the end part (the insertion end part on the side inserted into the piston chamber 10) of the piston 5 on the side opposite to the shoe mounting part side is a length which is 0.1 times or more and 0.5 times or less as long as the length of the outer circumferential surface of the piston protruding from the piston chamber at the bottom dead center, seizure of the end part of the piston 5 on the rear edge side and the end part of the piston chamber 10 on the side (back side of the piston chamber 10) opposite to the shoe mounting part side can be efficiently suppressed.

The present inventors assume that this is because the end part of the piston chamber 10 on the side opposite to the shoe mounting part side is located on the back side of the piston chamber 10, and accordingly, a degree, to which the piston 5 partially contacts, is small, and when the length of the crowning processed part is increased, it is hard for the piston 5 to advance and retreat smoothly.

According to the above-described embodiment, the crowning processing is performed on the end part (the protrusion end part on the side protruding from the piston chamber 10) situated on the shoe mounting part side in the axial direction of the outer circumferential surface of the cylindrical part 20 so as to form, in the cross section in the axial direction of the outer circumferential surface of the cylindrical part 20, the 1.2-order to 2.5-order curve within the range in which the length is 10% or more and 80% or less of the length of the cylindrical part 20 and the height is 10% or more and 160% or less of the clearance in case of using the front edge (the front edge of the protrusion end part) on the shoe mounting part side as a standard, and the tilt angle of the end part subjected to the crowning processing is within a range of 0° or more and less than 1°. Accordingly, the seizure of the end part of the piston 5 on the front edge side and the cylinder block 3 can be suppressed.

Further, according to the above-described embodiment, the crowning processing is performed on the end part (the insertion end part on the side inserted into the piston chamber 10) situated on the side opposite to the shoe mounting part side in the axial direction of the outer circumferential surface of the cylindrical part 20 so as to form, in the cross section in the axial direction of the outer circumferential surface of the cylindrical part 20, the 1.2-order to 2.5-order curve within the range in which the length is 10% or more and 60% or less of the length of the cylindrical part 20 and the height is 10% or more and 160% or less of the clearance in case of using the rear edge (the rear edge of the insertion end part) on the side opposite to the shoe mounting part side as a standard, and the tilt angle of the end part subjected to the crowning processing is within the range of 0° or more and less than 1°. Accordingly, the seizure of the end part of the piston 5 on the rear edge side and the cylinder block 3 can be suppressed.

Further, according to the above-described embodiment, the crowning processing is performed on the end part situated on the insertion side of the piston 5 in the inner circumferential surface of each piston chamber 10 so as to form, in the cross section in the axial direction of the inner circumferential surface of the piston chamber 10, the 1.2-order to 2.5-order curve is formed within the range in which the length is 8% or more and 60% or less of the length of the cylindrical part 20 and the height is 12% or more and 125% or less of the clearance in case of using the front edge on the side, into which the piston 5 is inserted, as a standard, and the tilt angle of the end part subjected to the crowning processing is within the range of 0° or more and less than 1°. Accordingly, the seizure of the piston 5 and the end part of the piston chamber 10 on the front edge side can be suppressed.

Further, according to the above-described embodiment, the length of the crowning processed part located at the end part (the protrusion end part on the side protruding from the piston chamber 10) of the piston 5 on the shoe mounting part side is a length equal to or longer than the length of the outer circumferential surface of the piston 5 protruding from the piston chamber 10 at the bottom dead center. Accordingly, the end in the axial direction of the inner circumferential surface of the piston chamber 10 on the shoe side always makes contact with a portion of the outer circumferential surface of the piston 5 where the crowning processed part is located. Therefore, a surface pressure of the end situated on the shoe 7 side in the axial direction of the inner circumferential surface of the piston chamber 10 and a surface pressure of the outer circumferential surface of the piston 5 in contact with this end does not become excessively large, and the seizure of the cylinder block 3 and the seizure of the piston 5 can be further suppressed.

Further, according to the above-described embodiment, the length of the crowning processed part located at the end part (the insertion end part on the side inserted into the piston chamber 10) of the piston 5 on the side opposite to the shoe mounting part side is a length which is from 0.1 times to 0.5 times as long as the length of the outer circumferential surface of the piston 5 protruding from the piston chamber 10 at the bottom dead center. Accordingly, the seizure of the end part of the piston 5 on the rear side and the seizure of the end part of the piston chamber 10 on the side opposite to the shoe mounting side can be efficiently suppressed, and the smooth advancing and retreating of the piston 5 are not prevented.

It should be noted that in the present embodiment, the length of the crowning processed part located at the end part (the protrusion end part on the side protruding from the piston chamber 10) of the piston 5 on the shoe mounting part side is equal to or longer than the length of the outer circumferential surface of the piston 5 protruding from the piston chamber 10 at the bottom dead center. However, in the present invention, the length of the crowning processed part located at the end part of the piston on the shoe mounting part side may be shorter than the length of the outer circumferential surface of the piston 5 protruding from the piston chamber at the bottom dead center.

Further, in the above-described embodiment, the length of the crowning processed part located at the end part (the insertion end part on the side inserted into the piston chamber 10) of the cylindrical part 20 of the piston 5 on the side opposite to the shoe mounting part side is the length which is 0.1 times or more and 0.5 times or less as long as the outer circumferential surface of the piston 5 protruding from the piston chamber 10 at the bottom dead center. However, in the present invention, the length of the crowning processed part located at the end part of the cylindrical part of the piston 5 on the side opposite to the shoe mounting part side may be a length which is shorter than 0.1 times as long as the outer circumferential surface of the piston 5 protruding from the piston chamber at the bottom dead center, or may be a length which is longer than 0.5 times.

It should be noted that as a dimension of the piston 5 used in the above-described embodiment, a diameter is within a range of 10 mm to 50 mm and an axial direction length is within a range of 20 mm to 130 mm. As a dimension of the piston chamber 10 (cylinder) of the cylinder block used in the above-described embodiment, a diameter is within a range of 10 mm to 50 mm and an axial direction length is within a range of 30 mm to 150 mm.

Further, in the above-described embodiment, the predetermined crowning processing determined for each end part is performed on the end part (the protrusion end part on the side protruding from the piston chamber 10) of the piston 5 on the front edge side, the end part (the insertion end part on the side inserted into the piston chamber 10) of the piston 5 on the rear edge side, and the end part of each piston chamber 10 on the front edge side (the side into which the piston is inserted). However, in the present invention, the predetermined crowning processing determined for each end part may be performed on at least one of the end part of the piston on the front edge side, the end part of the piston on the rear edge side, and the end part of each piston chamber on the front edge side.

Therefore, for example, the predetermined crowning processing may be performed only on the end part of the piston on the front edge side, the predetermined crowning processing may be performed only on the end part of the piston on the rear edge side, or the predetermined crowning processing may be performed only on the end part of each piston chamber on the front edge side. Further, the predetermined crowning processing determined for each end part may be performed only on two end parts selectively selected from the end part of the piston on the front edge side, the end part of the piston on the rear edge side, and the end part of each piston chamber on the front edge side.

DESCRIPTION OF REFERENCE SIGNS

2: Output shaft
3: Cylinder block
5: Piston
6: Swash plate
7: Shoe
10: Piston chamber
17: Tip part of piston
19: Piston mounting part of shoe
20: Cylindrical part of piston
21: Coupling part of piston

The invention claimed is:
1. A piston of an axial piston pump motor comprising:
a cylindrical part having an outer circumferential surface which is slide-fitted to an inner circumferential surface of a piston chamber of a cylinder block so as to be capable of advancing and retreating with a clearance between the outer circumferential surface and the inner circumferential surface, wherein
crowning processing has been performed on a protrusion end part situated on a side protruding from the piston chamber in an axial direction of the outer circumferential surface so as to form, in a cross section in the axial direction of the outer circumferential surface, a 1.2-order to 2.5-order curve within a range in which a length is 10% or more and 80% or less of a length of the cylindrical part and a height is 10% or more and

160% or less of the clearance in case of using a front edge of the protrusion end part as a standard, and a tilt angle of the end part subjected to the crowning processing is within a range of 0° or more and less than 1°.

2. An axial piston pump motor comprising:

a housing;

a cylinder block which is accommodated in the housing and connected to an output shaft, the cylinder block having a plurality of piston chambers; and the piston of the axial piston pump motor according to claim 1, wherein a length subjected to the crowning processing is a length equal to or longer than a length of the outer circumferential surface of the piston protruding from the piston chamber at a bottom dead center.

3. An axial piston pump motor comprising:

a housing;

a cylinder block which is accommodated in the housing and connected to an output shaft, the cylinder block having a plurality of piston chambers; and the piston of the axial piston pump motor according to claim 1, wherein crowning processing has been performed on an insertion end part situated on a side inserted into the piston chamber in an axial direction of the outer circumferential surface of the piston so as to form, in the cross section, a 1.2-order to 2.5-order curve within a range in which a length is 10% or more and 60% or less of the length of the cylindrical part and a height is 10% or more and 160% or less of the clearance in case of using a rear edge of the insertion end part as a standard, a tilt angle of the insertion end part subjected to the crowning processing is within a range of 0° or more and less than 1°, and a length of the insertion end part subjected to the crowning processing is a length which is 0.1 times or more and 0.5 times or less as long as a length of the outer circumferential surface of the piston protruding from the piston chamber at a bottom dead center.

4. The piston of an axial piston pump motor according to claim 1, wherein crowning processing has been performed on an insertion end part situated on a side inserted into the piston chamber in the axial direction of the outer circumferential surface so as to form, in the cross section, a 1.2-order to 2.5-order curve within a range in which a length is 10% or more and 60% or less of the length of the cylindrical part and a height is 10% or more and 160% or less of the clearance in case of using a rear edge of the insertion end part as a standard.

5. A cylinder block of an axial piston pump motor comprising:

a plurality of piston chambers disposed at intervals from one another in a circumferential direction of an output shaft, each of the piston chambers having an inner circumferential surface, into which a cylindrical part of a piston is inserted with a clearance so as to be capable of advancing and retreating, wherein crowning processing has been performed on an end part situated on an insertion side of the piston in the inner circumferential surface of each of the piston chambers so as to form, in a cross section in an axial direction of the inner circumferential surface, a 1.2-order to 2.5-order curve in a range in which a length is 8% or more and 60% or less of a length of the cylindrical part and a height is 12% or more and 125% or less of the clearance in case of using a front edge on the side, into which the piston is inserted, as a standard, and a tilt angle of the end part subjected to the crowning processing is within a range of 0° or more and less than 1°.

* * * * *